(12) United States Patent
Kim et al.

(10) Patent No.: US 11,126,240 B2
(45) Date of Patent: Sep. 21, 2021

(54) COMMUNICATION NODE IN VEHICLE NETWORK AND OPERATION METHOD OF THE COMMUNICATION NODE

(71) Applicants: HYUNDAI MOTOR COMPANY, Seoul (KR); KIA MOTORS CORPORATION, Seoul (KR)

(72) Inventors: Dong Ok Kim, Goyang-si (KR); Kang Woon Seo, Seoul (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 259 days.

(21) Appl. No.: 15/970,024

(22) Filed: May 3, 2018

(65) Prior Publication Data

US 2018/0321729 A1 Nov. 8, 2018

(30) Foreign Application Priority Data

May 4, 2017 (KR) ........................ 10-2017-0056779

(51) Int. Cl.
| | |
|---|---|
| *G06F 1/32* | (2019.01) |
| *G06F 1/3209* | (2019.01) |
| *H04L 12/40* | (2006.01) |
| *H04L 12/46* | (2006.01) |
| *G06F 1/3234* | (2019.01) |
| *G06F 1/3287* | (2019.01) |
| *H04L 12/12* | (2006.01) |

(52) U.S. Cl.
CPC .......... *G06F 1/3209* (2013.01); *G06F 1/3253* (2013.01); *G06F 1/3287* (2013.01); *H04L 12/12* (2013.01); *H04L 12/40* (2013.01); *H04L 12/4625* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 8,862,921 | B1* | 10/2014 | Kim | H02J 7/00 713/323 |
| 9,294,367 | B2* | 3/2016 | Natarajan | H04L 49/354 |
| 9,843,460 | B2* | 12/2017 | Sufleta | H04L 43/0817 |
| 2002/0134268 | A1* | 9/2002 | Yamada | G06K 15/00 101/484 |
| 2006/0282690 | A1* | 12/2006 | Cromer | G06F 1/3209 713/300 |
| 2009/0073481 | A1* | 3/2009 | Ferlitsch | G06F 1/3203 358/1.14 |
| 2011/0211443 | A1* | 9/2011 | Leong | H04L 63/1416 370/218 |
| 2012/0023340 | A1* | 1/2012 | Cheung | G06F 1/266 713/300 |

(Continued)

*Primary Examiner* — Danny Chan
(74) *Attorney, Agent, or Firm* — Morgan, Lewis & Bockius LLP

(57) ABSTRACT

A communication node in a vehicle network may comprise a medium access control (MAC) layer; a physical (PHY) layer; a first port connected to the PHY layer; a second port connected to the PHY layer; and a switch controlling a connection between the first port and the second port. The switch may turn on or off the connection between the first port and the second port under control of the MAC layer.

16 Claims, 11 Drawing Sheets

(56) References Cited

U.S. PATENT DOCUMENTS

| | | | |
|---|---|---|---|
| 2013/0065528 A1* | 3/2013 | Nagao | H04W 52/0277 455/41.2 |
| 2013/0086284 A1* | 4/2013 | Shaver | G06F 1/3287 710/18 |
| 2016/0179166 A1* | 6/2016 | Kurts | G06F 1/3206 713/323 |

* cited by examiner

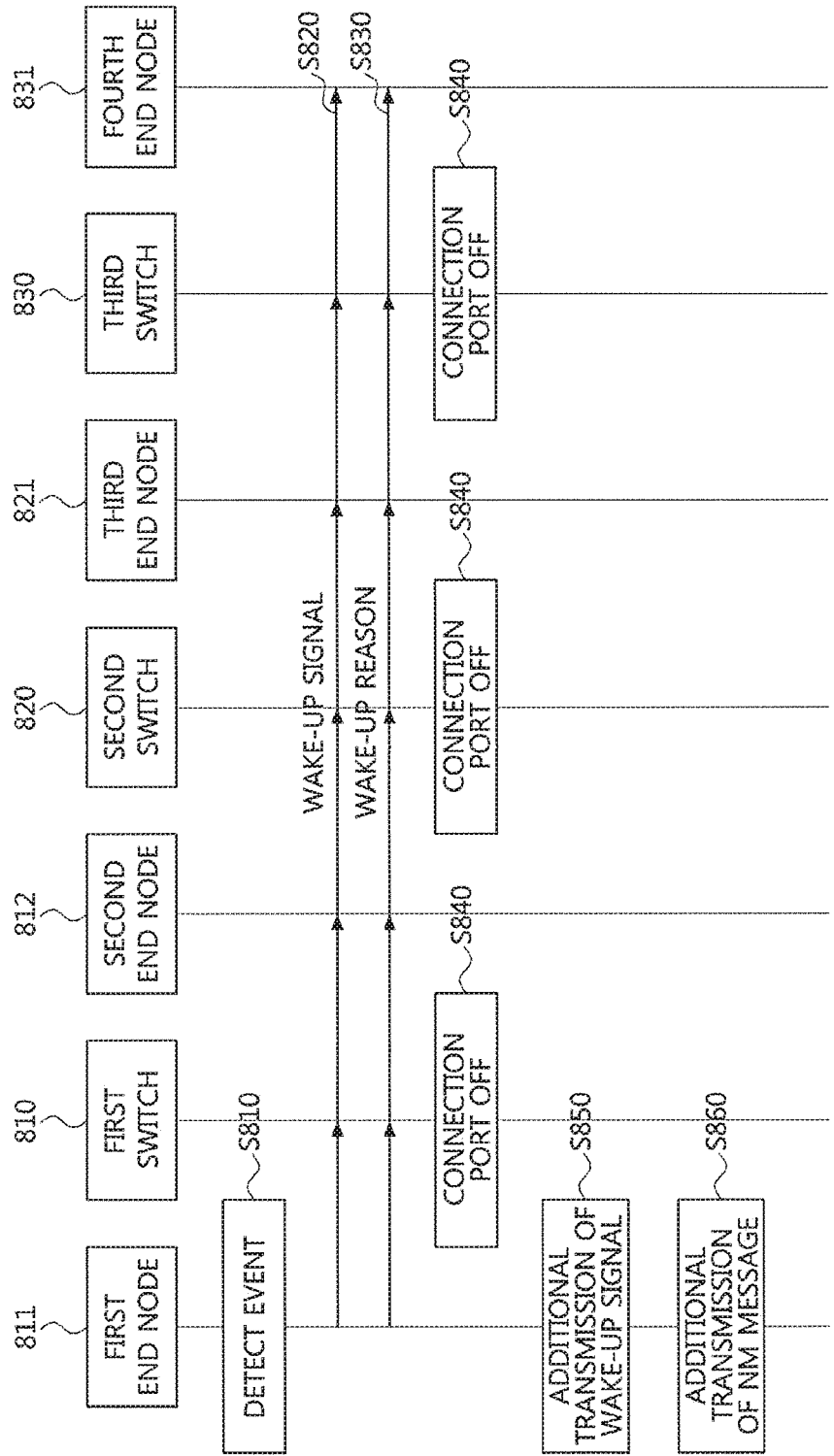

COMMUNICATION NODE IN VEHICLE NETWORK AND OPERATION METHOD OF THE COMMUNICATION NODE

CROSS-REFERENCE TO RELATED APPLICATIONS

This application is based on and claims the benefit of priority to Korean Patent Application No. 10-2017-0056779 filed on May 4, 2017 in the Korean Intellectual Property Office (KIPO), the entirety of which is incorporated by reference as if fully set forth herein.

TECHNICAL FIELD

The present disclosure relates to a vehicle network technology, and more specifically, to an operation method of a communication node for supporting a switching function in a vehicle network.

BACKGROUND

Electronic devices installed in a vehicle have been increased significantly in their number and variety along with recent digitalization of vehicle parts. Generally, the electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The vehicle network described above may include a plurality of communication nodes (e.g., electronic devices), and a first communication node may transmit a wake-up signal to a second communication node when a specific event is detected. Upon receiving the wake-up signal, an operation mode of the second communication node may transition from a sleep mode to a normal mode. Thereafter, the second communication node may perform operations according to a wake-up reason if the second communication node is aware of the wake-up reason. However, the second communication node may not be aware of the wake-up reason even if it is awake, so that the operations according to the wake-up reason may not be properly performed.

SUMMARY

The present disclosure provides an operation method of a communication node supporting a switching function in a vehicle network.

In accordance with embodiments of the present disclosure, a communication node in a vehicle network may comprise a medium access control (MAC) layer; a physical (PHY) layer, a first port connected to the PHY layer; a second port connected to the PHY layer; and a switch controlling a connection between the first port and the second port, wherein the switch turns on or off the connection between the first port and the second port under control of the MAC layer.

The PHY layer may apply a signal for changing an ON/OFF state of the switch to the switch when booting of the communication node is completed.

The switch may turn on the connection between the first port and the second port when the communication node is in a sleep mode, and turn off the connection between the first port and the second port when the communication node is awake and in a normal mode.

When the communication node is in a sleep mode, the switch may transfer a signal received through the first port to the second port, and the signal received through the first port may be transferred to another communication node through the second port.

The switch may comprise a first sub-switch receiving a signal from the PHY layer; and at least one second sub-switch controlling the connection between the first port and the second port according to an ON/OFF state of the first sub-switch.

The first sub-switch may include an N channel metal oxide silicon field effect transistor (MOSFET), and the at least one second sub-switch may include a P channel MOSFET.

The switch may comprise a first transistor including a source, a drain, and a gate receiving a signal from the PHY layer; a second transistor including a gate connected to the source of the first transistor, a source connected to the first port, and a drain connected to the second port; and a resistor connected between the source of the first transistor and a ground electrode.

The first transistor may be an N channel MOSFET, and the second transistor may be a P channel MOSFET.

The switch may further comprise a third transistor including a gate connected to the source of the first transistor, a source connected to the second port, and a drain connected to the first port.

The first transistor may be an N channel MOSFET, and the second and third transistors may be P channel MOSFETs.

The first port may receive a message indicating a wake-up reason from another communication node having detected an event.

When the communication node is in a sleep mode, the switch may transfer the message received through the first port to the second port, and the message received through the first port may be transferred to another communication node through the second port.

Further, in accordance with embodiments of the present disclosure, an operation method of a first communication node including a medium access control (MAC) layer, a physical (PHY) layer, a first port connected to the PHY layer, and a second port connected to the PHY layer may comprise receiving, by the first port, a signal from a second communication node; when the first communication node is in a sleep mode, transferring the signal received by the first port to the second port by electrically connecting the first port and the second port through a switch controlling a connection between the first port and the second port; and transferring, by the second port, the signal transferred from the first port to a third communication node connected to the second port.

The switch may turn on the connection between the first port and the second port when the first communication node is in a sleep mode, and may turn off the connection between the first port and the second port when the first communication node is awake and in a normal mode.

The operation method may further comprise receiving, by the first port, a message indicating a wake-up reason from the second communication node.

When the first communication node is in a sleep mode, the switch may transfer the message received through the first port to the second port, and the message received through the first port may be transferred to the third communication node through the second port.

The switch may comprise a first sub-switch receiving a signal from the PHY layer; and at least one second sub-switch controlling the connection between the first port and the second port according to an ON/OFF state of the first sub-switch.

The switch may comprise a first transistor including a source, a drain, and a gate receiving a signal from the PHY layer, a second transistor including a gate connected to the source of the first transistor, a source connected to the first port, and a drain connected to the second port; and a resistor connected between the source of the first transistor and a ground electrode, wherein the PHY layer may turn off the connection between the first port and the second port by applying a signal to the gate of the first transistor when the first communication node is awake and in a normal mode.

The switch may further comprise a third transistor including a gate connected to the source of the first transistor, a source connected to the second port, and a drain connected to the first port.

The first transistor may be an N channel MOSFET, and the second and third transistors may be P channel MOSFETs.

According to the embodiments of the present disclosure, the switches can be used to manage the electrical connections between the PHY layers of the switches. When the switches are in the sleep mode, signals are transmitted between the PHY layers through the switches, thereby shortening the time required for the end nodes to wake up. Also, a message indicating a wake-up reason can be transferred to the end nodes without missing.

BRIEF DESCRIPTION OF DRAWINGS

Embodiments of the present disclosure will become more apparent by describing in detail forms of the present disclosure with reference to the accompanying drawings, in which:

FIG. 14 is a sequence chart illustrating a process of transferring a wake-up signal in a vehicle network according to an embodiment of the present disclosure.

Figure 1:
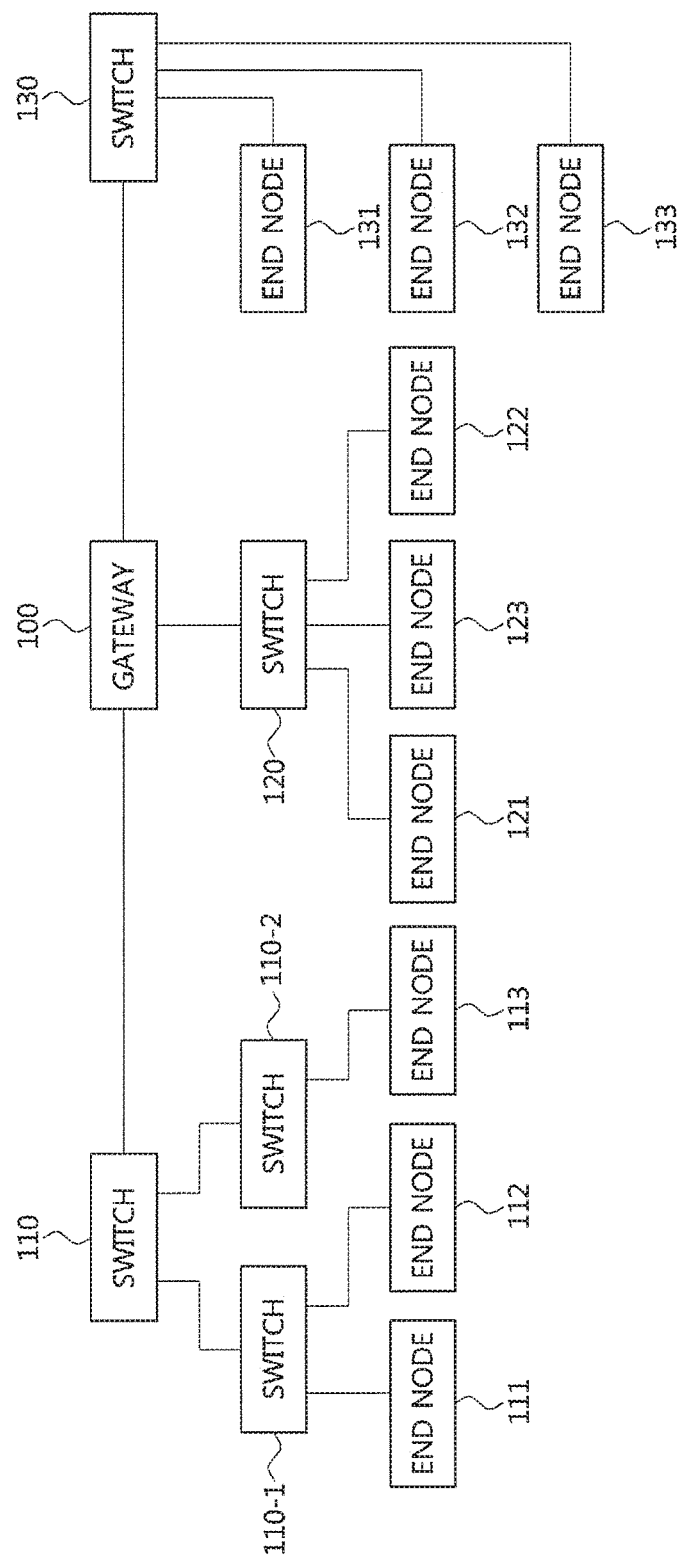
FIG. 1 is a block diagram illustrating a first embodiment of a vehicle network topology.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

The communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
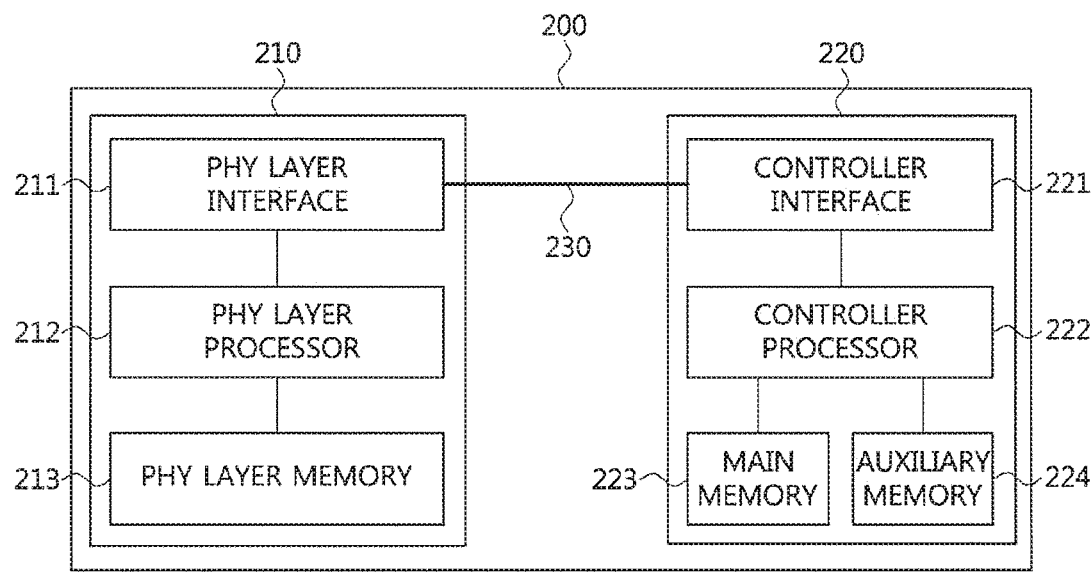
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network illustrated in, e.g., FIG. 1, may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

The communication node 200 may include only the controller 220, and the PHY layer 210 may be located outside the communication node 200. For example, the communication node 200 may be configured as follows.

Figure 3:
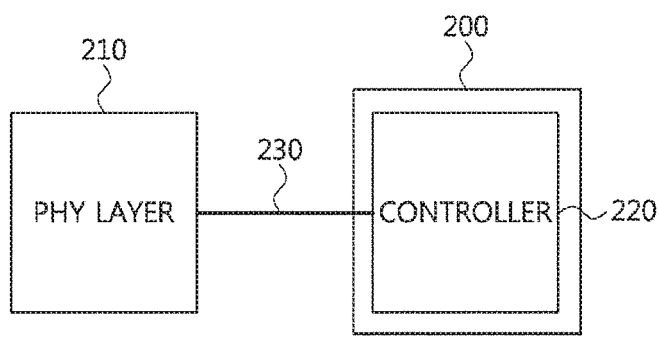
FIG. 3 is a block diagram illustrating a second embodiment of a communication node belonging to a vehicle network.

FIG. 3 is a block diagram illustrating a second embodiment of a communication node belonging to a vehicle network.

Referring to FIG. 3, the communication node 200 may include the controller 220 and may further include a regulator (not shown) for supplying power. The controller 220 may be connected to the PHY layer 210 located outside the communication node 200 and may control the PHY layer 210. Functions of the PHY layer 210 and the controller 220 shown in FIG. 3 may be the same as or similar to those of the PHY layer 210 and the controller 220 shown in FIG. 2.

The PHY layer 210 may be connected to the controller 220 via a media independent interface (MII) 230. The MII 230 may refer to an interface defined in IEEE 802.3, and may be configured as a data interface and a management interface between the PHY layer 210 and the controller 220. One of RMII, GMII, RGMII, SGMII, and XGMII may be used instead of the MII 230. The data interface may include a transmit channel and a receive channel, each of which may have independent clock, data, and control signals. The management interface may be configured as a two-signal interface, one for the clock and the other for the data.

A protocol structure of the communication node shown in FIG. 1 to FIG. 3 may be as follows.

Figure 4:
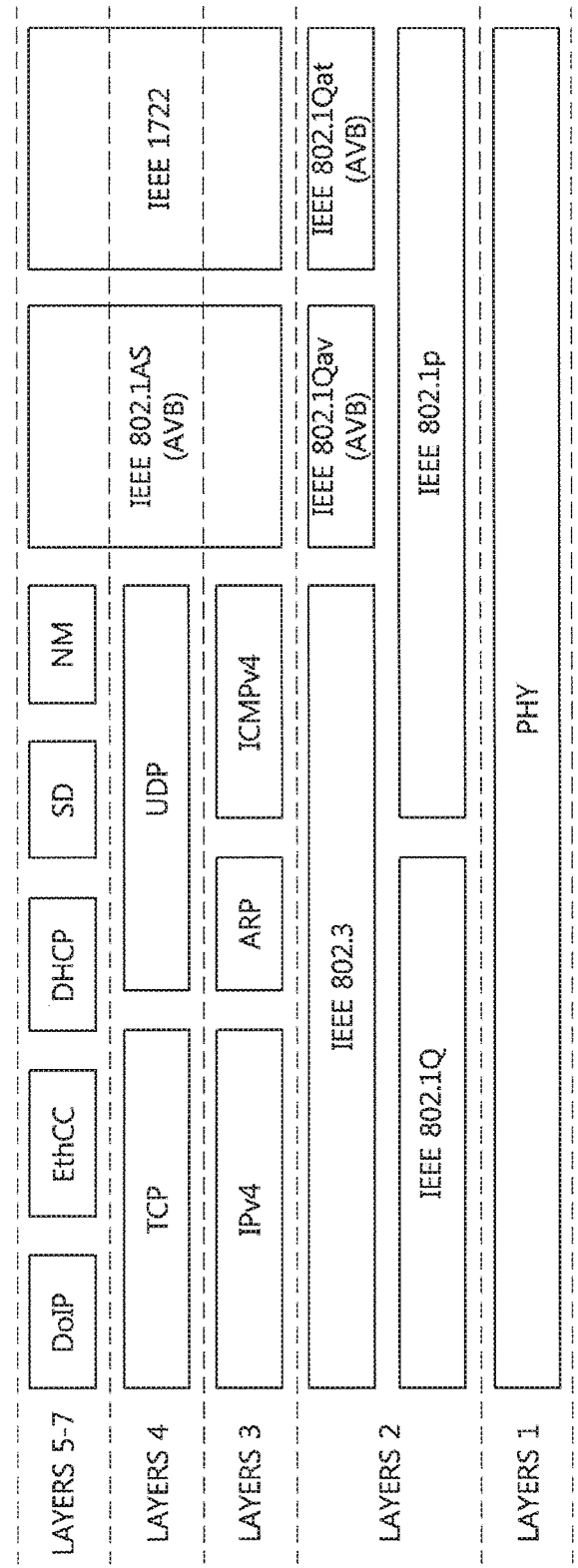
FIG. 4 is a block diagram illustrating a first embodiment of a protocol structure of a communication node constituting a vehicle network.

FIG. 4 is a block diagram illustrating a first embodiment of a protocol structure of a communication node constituting a vehicle network.

Referring to FIG. 4, a communication node may comprise layer 1 through layer 7. The layer 1 of the communication node may support the PHY functions and support a transmission rate of 100 megabits per second (Mbps). The layer 2 of the communication node may support IEEE 802.1Q protocol, IEEE 802.1p protocol, IEEE 802.3 protocol, audio video bridging (AVB) protocol (e.g., IEEE 802.1Qav protocol, IEEE 802.1Qat protocol), and the like. The layer 3 of the communication node may support internet protocol version 4 (IPv4), address resolution protocol (ARP), internet control message protocol version 4 (ICMPv4), IEEE 802.1AS, IEEE 1722, and the like. The layer 4 of the communication node may support transfer control protocol (TCP), user datagram protocol (UDP), IEEE 802.1AS, IEEE 1722, and the like. The layers 5 through 7 of the communication node may support diagnostics over internet protocol (DoIP), EthCC protocol, dynamic host configuration protocol (DHCP), SD protocol, network management (NM) protocol, IEEE 802.1AS, IEEE 1722, and the like.

The communication node described above may operate in a sleep mode or a normal mode. In the sleep mode, the PHY layer of the communication node may be in an enabled state, and the controller of the communication node may be in a disabled state. Alternatively, in the sleep mode, the PHY layer and the controller of the communication node may be in the disabled state. In the normal mode, the PHY layer and the controller of the communication node may be enabled. That is, the normal mode may indicate a state in which the communication node has waked up. When a wake-up signal is received or when a specific event is detected, the operating mode of the communication node may transition from the sleep mode to the normal mode. In this case, a system booting procedure of the communication node may be performed. The system booting procedure of the communication node may be performed as follows.

Figure 5:
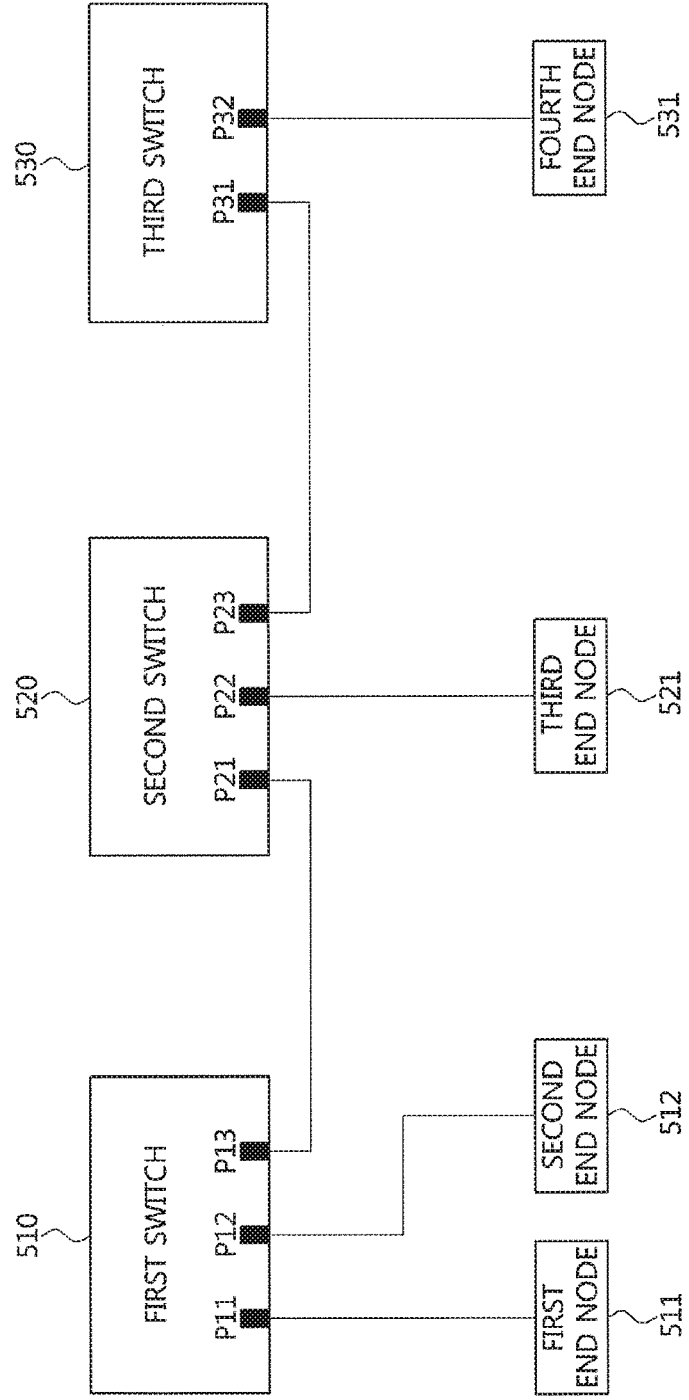
FIG. 5 is a block diagram illustrating a second embodiment of a vehicle network topology.

FIG. 5 is a block diagram illustrating a second embodiment of a vehicle network topology.

Referring to FIG. 5, a vehicle network may comprise a first switch 510, a second switch 520, a third switch 530, a first end node 511, a second end node 512, a third end node 521, a fourth end node 531, and the like. The switches 510, 520, and 530 may perform the same or similar functions as the switches shown in FIG. 1 and the end nodes 511, 512, 521, and 531 may perform the same or similar functions as the end nodes shown in FIG. 1. Each of the switches 510, 520, 530 and the end nodes 511, 512, 521, and 531 may be configured identically or similarly to the communication nodes shown in FIGS. 2 to 4.

The first switch 510 may be connected to the first end node 511 via a port P11, connected to the second end node 512 via a port P12, and connected to the second switch 520 via a port P31. The communications between the first switch 510 and the second switch 520 may be performed using one interface among MII, RMII, GMII, RGMII, SGMII, and XGMII. The second switch 520 may be connected to the first switch 510 via a port P21, connected to the third end node 521 via a port P22, and connected to the third switch 530 via a port P23. The communications between the second switch 520 and the third switch 530 may be performed using one interface among MII, RMII, GMII, RGMII, SGMII, and XGMII. The third switch 530 may be connected to the second switch 520 via a port P31 and connected to the fourth end node 531 via port a P32.

The first end node 511 may operate in the sleep mode and may detect an event (e.g., a local event). If an event is detected, the first end node 511 may perform a system booting procedure. Therefore, the operation mode of the first end node 511 may be transitioned from the sleep mode to the normal mode. That is, the first end node 511 may be woken up. Thereafter, the first end node 511 may transmit a wake-up signal. The wake-up signal transmitted by the first end node 511 may be input to the port P11 of the first switch 510. When the port P11 receives the wake-up signal, the first switch 510 may perform a system booting procedure.

Figure 6:
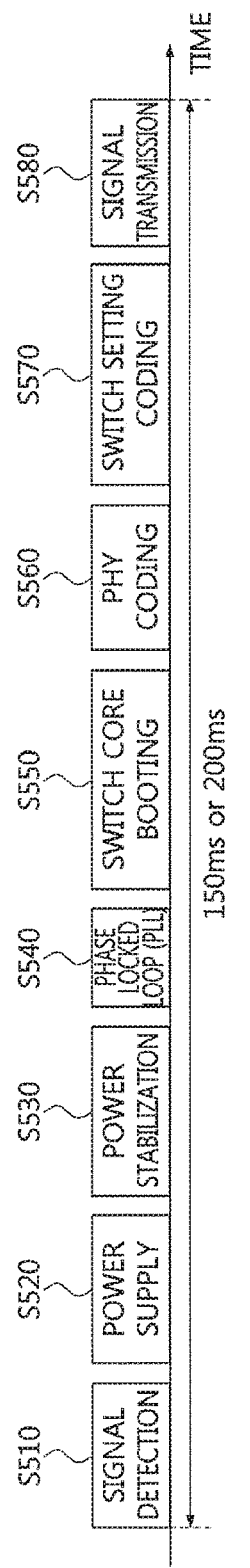
FIG. 6 is a timing diagram illustrating an embodiment of a system booting procedure performed at a communication node.

FIG. 6 is a timing diagram illustrating an embodiment of a system booting procedure performed at a communication node.

Referring to FIG. 6, the system booting procedure may be performed at a switch (or, an end node or a gateway), and may include a signal detection step 510, a power supply step S520, a power stabilization step S530, a phase locked loop (PLL) step S540, a switch core booting step S550, a PHY coding step S560, a switch setting coding step S570, a signal transmission step S580, and the like. For example, in the step S510, when a wake-up signal is received from another communication node (e.g., an end node) or when a specific event is detected, power may be supplied to the switch, and the controller (e.g., core) of the switch may be enabled. Thereafter, the switch may transmit signals over the PHY link after performing a coding procedure (e.g., the steps S550, S560, and S570).

The system booting procedure described above may be completed within a maximum of 150 milliseconds when the switch (or, an end node or a gateway) is the communication node shown in FIG. 2 (i.e., the case that the PHY layer is located inside the switch). On the other hand, the system booting procedure may be completed within a maximum of 200 ms when the switch (or, an end node or a gateway) is the communication node shown in FIG. 3 (i.e., the case that the PHY layer is located outside the switch).

As described above, since it takes time for the communication node to boot up the system, it takes time for the other end nodes 512, 621, and 631 to wake up after the first end node 511 is woken up.

Figure 7:
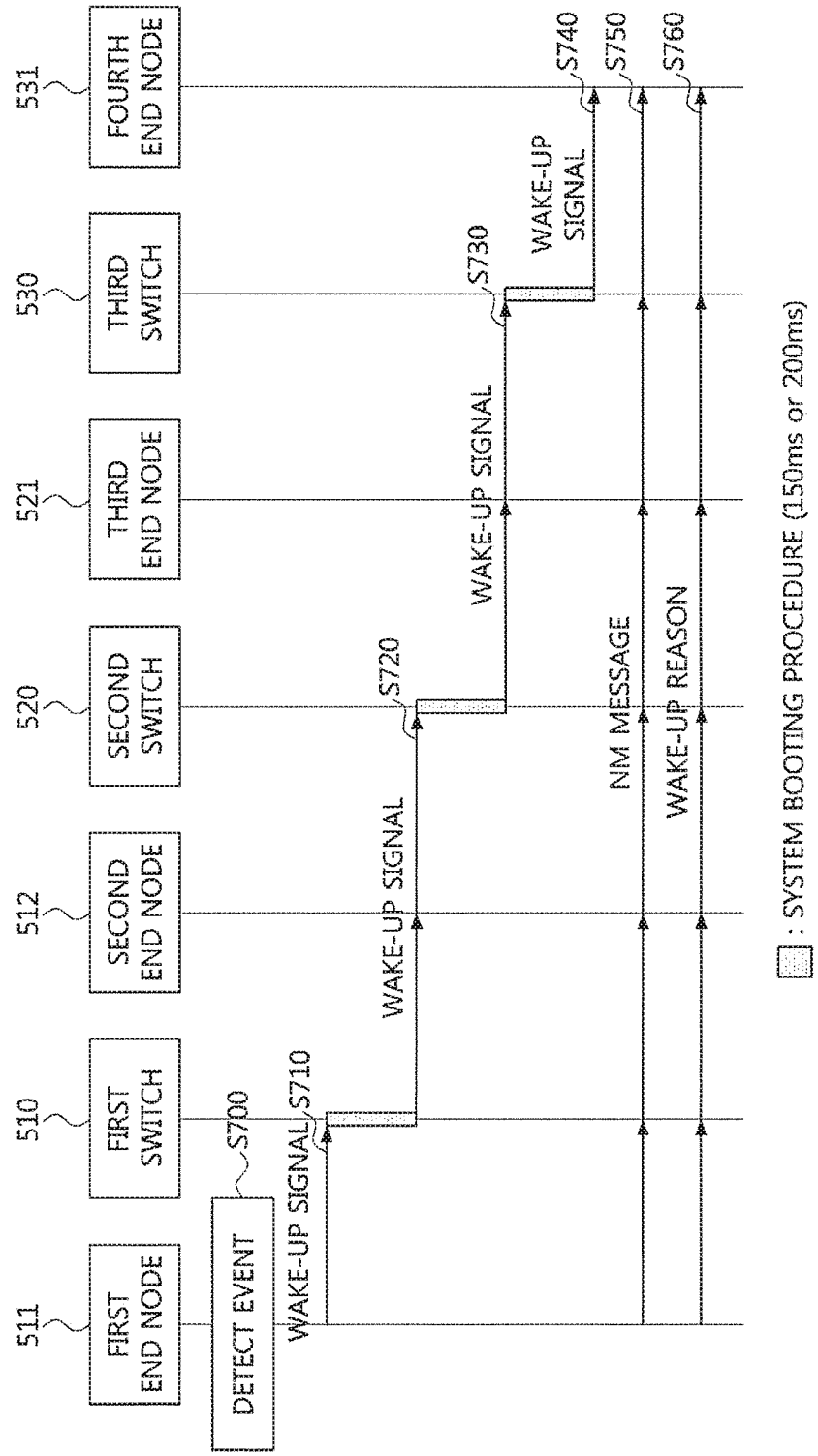
FIG. 7 is a sequence chart illustrating a process of transferring a wake-up signal in the vehicle network shown in FIG. 5.

FIG. 7 is a sequence chart illustrating a process of transferring a wake-up signal in the vehicle network shown in FIG. 5.

Referring to FIG. 7, in step S700, the first end node 511 may detect an event (e.g., a local event). If an event is detected, the first end node 511 may perform a system booting procedure. The first end node 511 may transmit a wake-up signal after wake-up in step S710. The wake-up signal transmitted by the first end node 511 may be input to the port P11. The first switch 510 may receive the wake-up signal from the first end node 511, and perform a system booting procedure. As described above, it may take 150 ms or 200 ms to boot up the first switch 510.

In step S720, the first switch 510 may also transmit a wake-up signal. The wake-up signal may be transmitted in a broadcasting manner. For example, the wake-up signal may be transmitted through the ports P12 and P13 of the first switch 510.

The second end node 512 may receive the wake-up signal from the first switch 510 and perform a system booting procedure (i.e., the system booting procedure shown in FIG. 6) based on the wake-up signal. As described above, since the system booting of the first switch 510 is time-consuming, the system booting of the second end node 512 may be delayed.

The second switch 520 may receive the wake-up signal from the first switch 510 via the port P21, and perform a system booting procedure (i.e., the system booting procedure shown in FIG. 6) based on the wake-up signal so as to operate in the normal mode. As described above, since the system booting of the first switch 510 is time-consuming, the system booting of the second switch 520 may be delayed.

Up to 150 ms or 200 ms may be required to perform the system booting procedure. After booting the system, in step S730, the second switch 520 may also transmit a wake-up signal. The wake-up signal may be transmitted in a broadcasting manner. For example, the wake-up signal may be transmitted via the ports P22 and P23 of the second switch 520.

The third end node 521 may receive the wake-up signal from the second switch 520, and perform a system booting procedure (i.e., the system booting procedure shown in FIG. 6) based on the wake-up signal so as to operate in the normal mode. Since the system booting of the first and second switches 510 and 520 is time-consuming, the system booting of the third end node 521 may be further delayed than the first end node and the second end node.

The third switch 530 may receive the wake-up signal from the second switch 520 via the port P31, and perform a system booting procedure (i.e., the system booting procedure shown in FIG. 6) based on the wake-up signal so as to operate in the normal mode. Up to 150 ms or 200 ms may be required to perform the system booting procedure.

In step S740, the third switch 530 may also transmit a wake-up signal. The wake-up signal may be transmitted in a broadcasting manner. For example, the wake-up signal may be transmitted via the port P32 of the third switch 530. The fourth end node 531 may receive the wake-up signal from the third switch 530 and perform a system booting procedure (i.e., the system booting procedure shown in FIG.

6) based on the wake-up signal so as to operate in the normal mode. Since the system booting of the first, second, and third switches 510, 520, and 530 is time-consuming, the system booting of the fourth end node 531 may be further delayed than the first, second, and third end nodes.

In step S750, the woken-up first end node 511 may generate a message and transmit the message in a broadcasting manner (S750). A wake-up reason indicated by the message may include, by way of example, the following:
- Door operation (e.g., door open, door closed)
- Telematics operation (e.g., remote start)
- Media operation
- Power mode transition of the vehicle (e.g., ACC, IGN)
- Detection of theft In case that the message indicating a wake-up reason is transmitted before another communication node (e.g., the first switch 510, the second switch 520, the third switch 530, the second end node 512, the third end node 521, the fourth end node 531, or the like) included in the vehicle network is woken up, the message may not be received at the another communication node in step S760. As a result, another communication node may not know the wake-up reason of it. Thus, the message indicating the wake-up reason may be transmitted after all of the communication nodes constituting the vehicle network have been woken up. However, a time taken for all of the communication nodes constituting the vehicle network to wake up may vary depending on the configuration of the vehicle network. Therefore, in some cases, the message indicating the wake-up reason may not be transmitted to some communication nodes.

Figure 8:
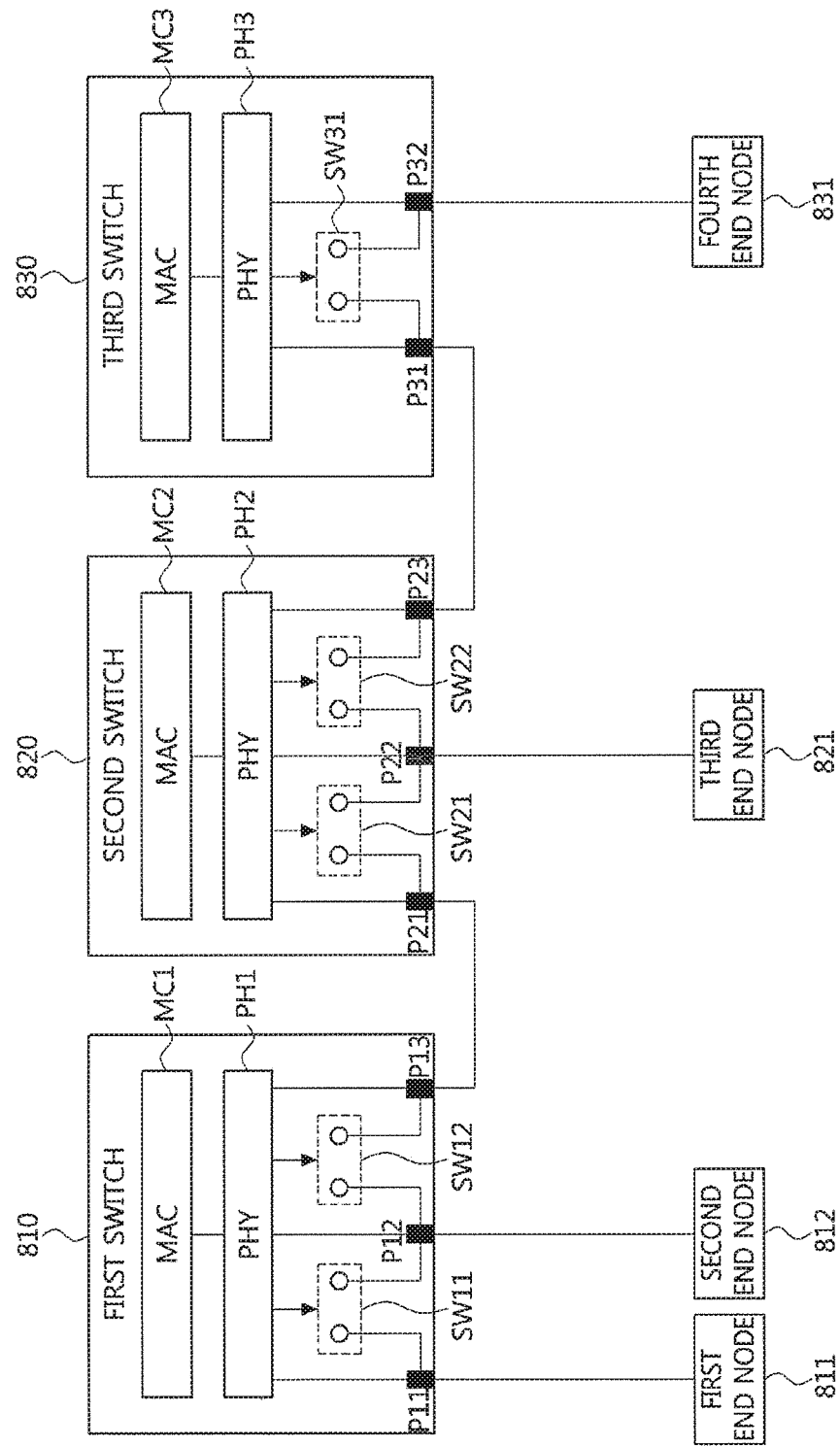
FIG. 8 is a conceptual diagram illustrating a topology of a vehicle network according to an embodiment of the present disclosure.

FIG. 8 is a conceptual diagram illustrating a topology of a vehicle network according to an embodiment of the present disclosure. The communication nodes shown in FIG. 8 may be communication nodes that respectively perform the functions of the first switch 510, the second switch 520, and the third switch 530 shown in FIG. 5. In the following description of the embodiment of FIG. 8, the description redundant with that of FIG. 5 is omitted.

Referring to FIG. 8, a communication node may include a medium access control (MAC) layer, a physical (PHY) layer, a plurality of connection ports connected to the PHY layer, and at least one switch for managing connections between the ports. For example, the first switch 810 may include a MAC layer MC1, a PHY layer PH1, ports P11, P12, and P13, a switch SW11, and a switch SW12. The PHY layer PH1 may process signals received from the ports P11, P12, and P13, and may transmit a processing result to the MAC layer MC1. Also, the PHY layer PH1 may operate under control of the MAC layer MC1. The PHY layer PH1 may receive signals from a first end node 811 and a second end node 812 via the port P1 and the port P12. The PHY layer PH1 may transmit a signal to the second switch 820 via port the P13. The PHY layer PH1 may apply signals to the switches SW11 and SW12. The ON/OFF states of the switches SW11 and SW12 may be changed depending on whether or not the signal of the PHY layer PH1 is applied.

The switch SW11 may turn on or off an electrical connection between the port P11 and the port P12. The switch SW12 may turn on or off an electrical connection between the port P12 and the port P13. The PHY layer PH1 of the first switch 810 may change the ON/OFF states of the switches SW11 and SW12 by applying signals to the switches SW11 and SW12.

The second switch 820 may include a switch SW21 and a switch SW22. The switch SW21 may turn on or off an electrical connection between the port P21 and the port P22. The switch SW22 may turn on or off an electrical connection between the port P22 and the port P23. The PHY layer PH2 of the second switch 820 may change the ON/OFF state of the switches SW21 and SW22 by applying signals to the switches SW21 and SW22.

The third switch 830 may include a switch SW31. The switch SW31 may turn on or off an electrical connection between the port P31 and the port P32. The PHY layer PH3 of the third switch 830 may change the ON/OFF state of the switch SW31 by applying a signal to the switch SW31.

When the switches 810, 820, and 830 are in the sleep mode, the switches SW11-SW31 may be in ON state. Accordingly, the PHY layers of the switches 810, 820, and 830 may be electrically connected to each other. When the first end node 811 transmits a wake-up signal, the wake-up signal may be input to the port P11 of the first switch 810. At this time, since the switches SW11, SW12, SW21, SW22, and SW31 may be in ON state, the wake-up signal may be transferred to the other ports P12, P13, P21, P22, P23, P31, and P32 before the system booting of the switches 810, 820, and 830 is completed. Therefore, the wake-up signal input to the port P11 of the first switch may also be transferred to the second switch and the third switch.

The wake-up signal may be transferred to the end nodes 812, 821, and 832 respectively connected to the ports P12, P22, and P32 via the ports P12, P22, and P32. Accordingly, before the system booting of the first switch 810, the second switch 820, and the third switch 830 is performed, the wake-up signal may be transferred to the second end node 812, the third end node 821, and the fourth end node 831. The second end node 812, the third end node 821, and the fourth end node 831 may perform the system booting procedure almost simultaneously.

The switches SW11-SW31 may be changed to OFF state after the system booting of the switches 810, 820, and 830. For example, the PHY layer PH1 of the first switch 810 may apply signals to the switches SW11 and SW12 after the system booting of the first switch 810 is completed, and the switches SW11 and SW12 may be changed to OFF state. The PHY layer PH2 of the second switch 820 may apply signals to the switches SW21 and SW22 after the system booting of the second switch 820 is completed, and the switches SW21 and SW22 may be changed to OFF state. Also, the PHY layer PH3 of the third switch 830 may change the switch SW31 to the OFF state by applying a signal to the switch SW31 after the system booting of the third switch 830 is completed.

When the switches SW11 and SW12 are in OFF state, the ports P11, P12, and P13 of the first switch 810 may be electrically disconnected. Accordingly, the first switch 810 can independently apply signals to the ports P11, P12, and P13, respectively. Also, the first switch 810 can independently transmit signals to the first end node 811 and the second end node 812, respectively.

When the switches SW21 and SW22 are in OFF state, the ports P21, P22, and P23 of the second switch 820 may be electrically disconnected. Accordingly, the second switch 820 can independently apply signals to the ports P21, P22, and P23, respectively.

When the switch SW31 is in OFF state, the ports P31 and P32 of the third switch 830 may be electrically disconnected. Accordingly, the third switch 830 can independently apply signals to the ports P31 and P32, respectively.

Figure 9:
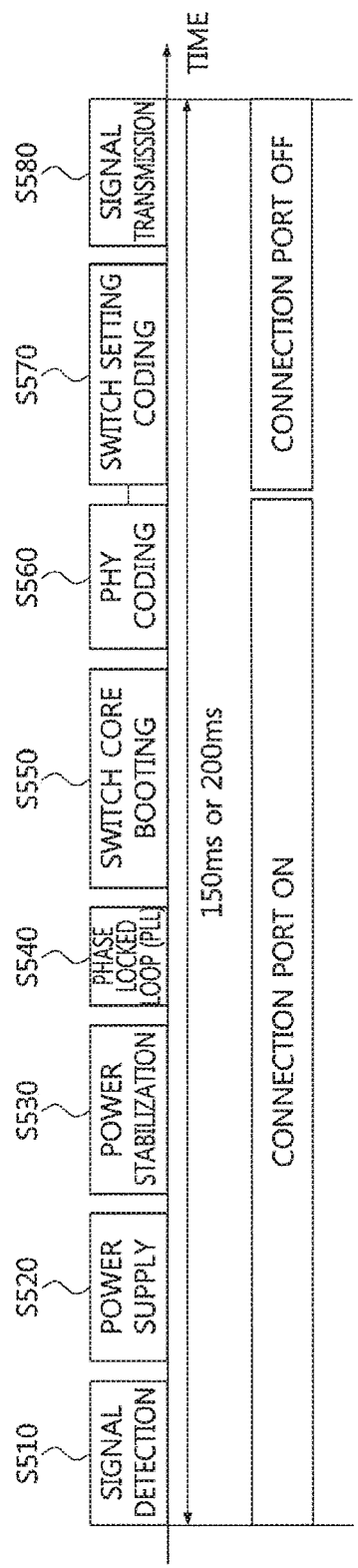
FIG. 9 is a timing diagram illustrating states of switches as compared with the system booting procedure shown in FIG. 6.

FIG. 9 is a timing diagram illustrating states of switches as compared with the system booting procedure shown in FIG. 6. In describing the embodiment of FIG. 9, the description redundant with that of FIG. 6 is omitted. Hereinafter, a case of the first switch 810 will be described as an example.

Referring to FIG. 9, the first switch 810 may receive a wake-up signal from the first end node 811 and perform a system boot procedure. When the system booting procedure of the first switch 810 is completed, the PHY layer PH1 may generate a signal to be transmitted through the ports P11, P12, and P13 (S560). When the system booting procedure is completed, the PHY layer PH1 may apply the signal to the switches SW11 and SW12 under the control of the MAC layer MC1. When the signal is applied to the switches SW11 and SW12, the switches SW11 and SW12 may be changed to OFF state. Therefore, when the first switch 810 wakes up and enters the normal mode, the switches SW11 and SW12 may turn off the electrical connections between the ports P11, P12 and P13. The first switch 810 can independently transmit signals through the ports P11, P12, and P13.

Hereinafter, circuit configurations of the switches SW11, SW12, SW21, SW22, and SW31 will be described. In the following description, the switch SW11 between the port P11 and the port P12 will be described as an example for convenience. The embodiments described below may also be applied to other switches SW12, SW21, SW22, and SW31.

Figure 10:
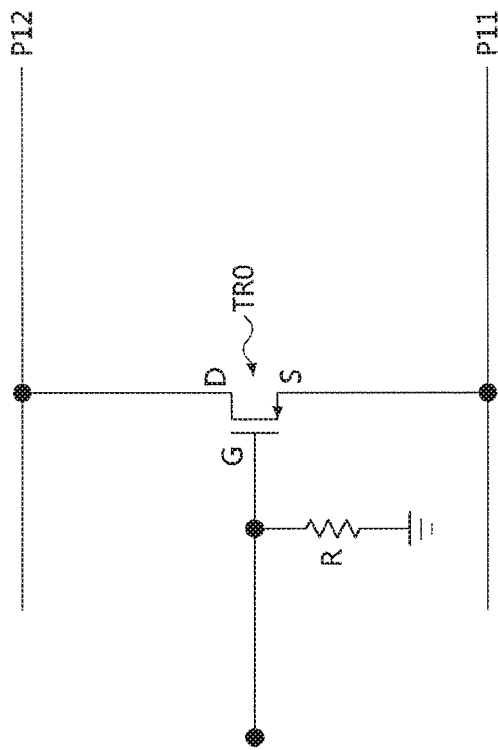
FIG. 10 is a circuit diagram showing a first embodiment of the switch SW11.

FIG. 10 is a circuit diagram showing a first embodiment of the switch SW11.

Referring to FIG. 10, the switch SW11 may include a transistor TR0 that connects the port P11 and the port P12. The transistor TR0 may be a P channel metal oxide silicon on field transistor (MOSFET). However, the embodiment is not limited thereto, and the transistor TR0 may be a different type of transistor.

A drain (denoted by 'D') of the transistor TR0 may be connected to the port P12. A source (denoted by 'S') of the transistor TR0 may be connected to the port P11. A resistor R may be provided between a gate (denoted by 'G') of the transistor TR0 and a ground electrode. Therefore, when no signal is input to the gate of the transistor TR0, a gate potential of the transistor TR0 may be equal to a ground potential. For example, when the wake-up signal is input from the first end node 811 to the port P11, the potential of the source may be increased. A potential difference between the gate and the source becomes a negative value, so that a current may flow from the source to the drain of the transistor TR0. Therefore, the wake-up signal may be transferred from the port P11 to the port P12.

When the system booting of the first switch 810 is completed, the PHY layer PH1 may apply a signal to the gate of the transistor TR0. When a current is applied to the resistor R, a potential difference may be generated across the resistor R. Therefore, a positive potential may be applied to the gate of the transistor TR0. In this case, even if a signal is applied to the port P11, the potential difference between the gate and the source may not become smaller than a reference potential difference. Therefore, the transistor TR0 can turn off the electrical connection between the port P11 and the port P12.

Figure 11:
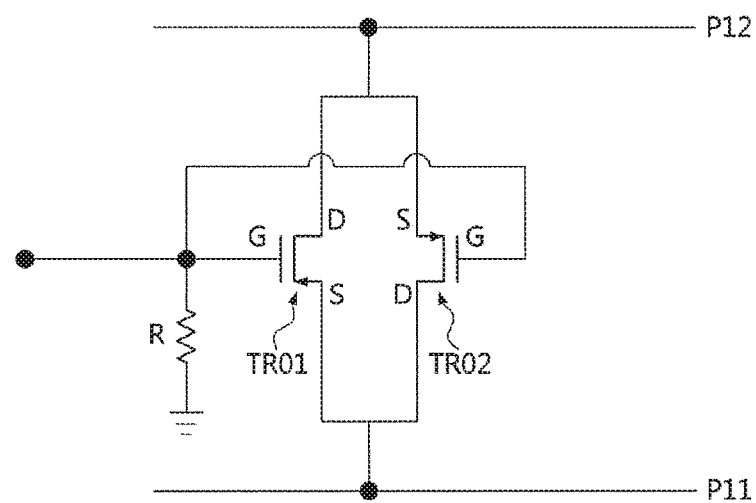
FIG. 11 is a circuit diagram showing a second embodiment of the switch SW11.

FIG. 11 is a circuit diagram showing a second embodiment of the switch SW11.

Referring to FIG. 11, the switch SW11 may include a transistor TR01 and a transistor TR02 that connect the port P11 and the port P12. Each of the transistors TR01 and TR02 may be a P channel MOSFET. However, the embodiment is not limited thereto, and each of the transistors TR01 and TR02 may be a different type of transistor.

A drain of the transistor TR01 may be connected to the port P12. A source of the transistor TR01 may be connected to the port P11. A current may flow from the source to the drain in the transistor TR01 when the transistor TR01 is a P channel MOSFET. Therefore, the transistor TR01 may transfer a signal input to the port P11 to the port P12.

On the other hand, a drain of the transistor TR02 may be connected to the port P11. A source of the transistor TR02 may be connected to the port P12. A current may flow from the source to the drain in the transistor TR02 when the transistor TR02 is a P channel MOSFET. Therefore, the transistor TR02 may transfer a signal input to the port P12 to the port P11. That is, since the switch SW11 includes the transistors TR01 and TR02, it is possible to transmit signals in both directions between the ports P11 and P12.

When the system booting of the first switch 810 is completed, the PHY layer PH1 may apply a signal to the gate of the transistor TR01 and the gate of the transistor TR02. When a current is applied to the resistor R, a potential difference may be generated across the resistor R. Therefore, a positive potential may be applied to the gate of the transistor TR01 and the gate of the transistor TR02. In this case, even if a signal is applied to the port P11 or the port P12, the transistor TR01 and the transistor TR02 may not pass a current. Therefore, the transistor TR01 and the transistor TR02 can turn off the electrical connection between the port P11 and the port P12.

Figure 12:
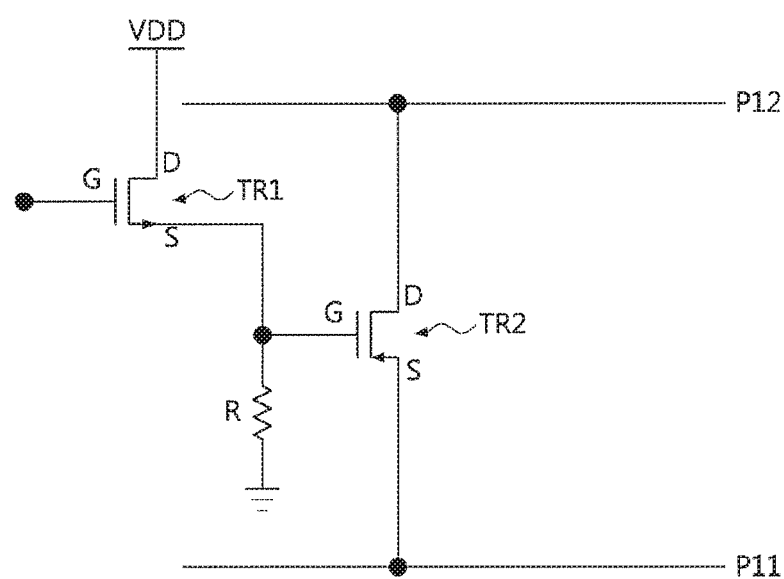
FIG. 12 is a circuit diagram showing a third embodiment of the switch SW11.

FIG. 12 is a circuit diagram showing a third embodiment of the switch SW1.

Referring to FIG. 12, the switch SW11 may include a first sub-switch for receiving a signal from the PHY layer PH1 and a second sub-switch for controlling the electrical connection between the port P11 and the port P12 according to the ON/OFF state of the first sub-switch. The first sub-switch may be a transistor TR1, and the second sub-switch may be a transistor TR2. The transistor TR1 may be an N channel MOSFET, and the transistor TR2 may be a P channel MOSFET.

The signal of the PHY layer PH1 may be applied to a gate of the transistor TR1. A drain of the transistor TR1 may be connected to a power source for applying a drain potential $V_{DD}$. A source of the transistor TR1 may be connected to a gate of the transistor TR2. A resistor R may be provided between the source of the transistor TR1 and a ground electrode. The resistor R may be located between a gate of the transistor TR2 and the ground electrode.

A source of the transistor TR2 may be connected to the port P11. Also, a drain of the transistor TR2 may be connected to the port P12.

When the transistor TR1 is an N channel MOSFET, a current may not flow through the transistor TR1 unless a signal is applied to the gate of the transistor TR1. The gate potential of the transistor TR2 may be equal to the ground potential. When the transistor TR2 is a P channel MOSFET, if a signal is applied to the port P11, a current may flow from the source to the drain of the transistor TR2. Therefore, the transistor TR2 can transfer a signal input to the port P11 to the port P12.

On the other hand, when a signal is applied to the gate of the transistor TR1, a current may flow from the drain to the source of the transistor TR1. As a result, a positive potential may be applied to the gate of the transistor TR2. If the transistor TR2 is a P channel MOSFET, a current may not flow through the transistor TR2 as the positive potential is applied to the gate of the transistor TR2. Therefore, the transistor TR2 can turn off the connection between the port P11 and the port P12.

As illustrated in FIG. 12, when the gate potential of the transistor TR2 is adjusted through the transistor TR1, even if only a small intensity signal is input to the gate of the transistor TR1, the gate potential of the transistor TR2 can be easily adjusted by a current amplification effect of the transistor TR1.

Figure 13:
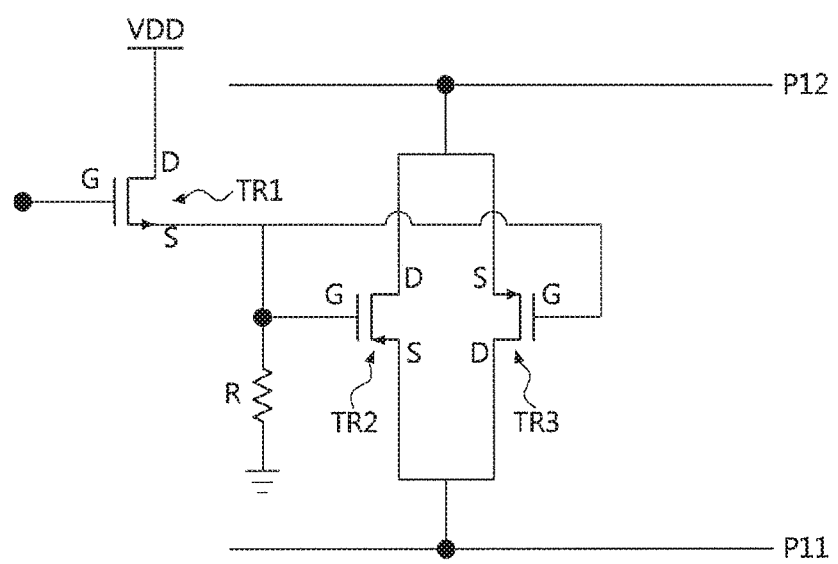
FIG. 13 is a circuit diagram showing a fourth embodiment of the switch SW11.

FIG. 13 is a circuit diagram showing a fourth embodiment of the switch SW11.

Referring to FIG. 13, the switch SW11 may include a first sub-switch and a second sub-switch for controlling the electrical connection between the port P11 and the port P12 according to the ON/OFF state of the first sub-switch. The first sub-switch may be a transistor TR1, and the second sub-switch may include a transistor TR2 and a transistor TR3.

The transistor TR1 may be an N channel MOSFET, and the transistors TR2 and TR3 may be P channel MOSFETs.

A signal of the PHY layer PH1 may be applied to a gate of the transistor TR1. A drain of the transistor TR1 may be connected to a power source for applying a drain potential $V_{DD}$. A source of the transistor TR1 may be connected to a gate of the transistor TR2 and a gate of the transistor TR3. A resistor R may be provided between the source of the transistor TR1 and a ground electrode. The resistor R may be located between a gate of the transistor TR2 and the ground electrode. The resistor R may be located between a gate of the transistor TR3 and the ground electrode. The source of the transistor TR2 may be connected to the port P11. The drain of the transistor TR2 may be connected to the port P12. A source of the transistor TR3 may be connected to the port P12. A drain of the transistor TR3 may be connected to the port P11.

When the transistor TR1 is an N channel MOSFET, a current may not flow through the transistor TR1 unless a signal is applied to the gate of the transistor TR1. The gate potential of the transistor TR2 and the gate potential of the transistor TR3 may be equal to the ground potential. When the transistor TR2 is a P channel MOSFET, if a signal is applied to the port P11, a current may flow from the source to the drain of the transistor TR2. Therefore, the transistor TR2 can transfer a signal input to the port P11 to the port P12. When the transistor TR3 is a P channel MOSFET, if a signal is applied to the port P12, a current may flow from the source to the drain of the transistor TR3. Therefore, the transistor TR3 can transfer a signal input to the port P12 to the port P11. That is, since the switch SW11 includes the transistor TR2 and the transistor TR3, it is possible to transfer signals in both directions between the ports P11 and P12.

On the other hand, when a signal is applied to the gate of the transistor TR1, a current may flow from the drain to the source of the transistor TR1. Therefore, a positive potential may be applied to the gate of the transistor TR2 and the gate of the transistor TR3. If the transistor TR2 is a P channel MOSFET, a current may not flow through the transistor TR2 as the positive potential is applied to the gate of the transistor TR2. Likewise, if the transistor TR3 is a P channel MOSFET, a current may not flow through the transistor TR3 as the positive potential is applied to the gate of the transistor TR3. Therefore, the transistor TR2 and the transistor TR3 can turn off the connection between the port P11 and the port P12.

As illustrated in FIG. 13, when the gate potential of the transistor TR2 and the gate potential of the transistor TR3 are adjusted through the transistor TR1, even if only a small intensity signal is input to the gate of the transistor TR1, the gate potential of the transistor TR2 and the gate potential of the transistor TR3 can be easily adjusted by a current amplification effect of the transistor TR1.

FIG. 14 is a sequence chart illustrating a process of transferring a wake-up signal in a vehicle network according to an embodiment of the present disclosure.

In step S810, the first end node 811 may detect an event. The first end node 811 may detect an event and perform a system booting procedure.

In step S820, the first end node 811 may transmit a wake-up signal. The wake-up signal transmitted by the first end node 811 may be input to the port P11 of the first switch 810. When the first end node 811 transmits the wake-up signal, the switches SW11, SW12, SW21, SW22, and SW31 may be in ON state. Therefore, the wake-up signal transmitted by the first end node 811 may be transferred through the ports P11, P12, P13, P21, P22, P23, P31, and P32 of the switches 810, 820, and 830. The second end node 812, the third end node 821, and the fourth end node 831 may receive the wake-up signal. Since the ports P11, P12, P13, P21, P22, P23, P31, and P32 of the switches 810, 820, and 830 are electrically connected through the switches SW11, SW12, SW21, SW22 and SW31, the first end node 811, the second end node 812, the third end node 821, and the fourth end node 831 can receive the wake-up signal almost simultaneously. Further, the first end node 811, the second end node 812, the third end node 821, and the fourth end node 831 can perform the system booting procedure almost simultaneously.

In step S830, the first end node 811 may transmit a message. The message may be a message indicating a wake-up reason. When the first end node 811 transmits the message, the switches SW11, SW12, SW21, SW22, and SW31 may be in the ON state. Therefore, the message transmitted by the first end node 811 may be transferred through the ports P11, P12, P13, P21, P22, P23, P31, and P32 of the switches 810, 820, and 830. The second end node 812, the third end node 821, and the fourth end node 831 may receive the message. Since the ports P11, P12, P13, P21, P22, P23, P31, and P32 of the switches 810, 820, and 830 are electrically connected through the switches SW11, SW12, SW21, SW22 and SW31, the first end node 811, the second end node 812, the third end node 821, and the fourth end node 831 can receive the message almost simultaneously. Also, since the message is transferred without the system booting of the switches 810, 820, and 830, the message transmitted by the first end node 811 can be transferred to the other end nodes 812, 821 and 831 without missing the message. The end nodes 812, 821, and 831 may identify the reason for the wake-up from the received message.

In step S840, the switches 810, 820, and 830 may change the switches to OFF state. The first switch 810 may change the switches SW11 and SW12 to OFF state. When the switches SW11 and SW12 are changed to OFF state, the ports P11, P12, and P13 may be electrically disconnected from each other. The second switch 820 may change the switches SW21 and SW22 to OFF state. When the switches SW21 and SW22 are changed to OFF state, the ports P21, P22, and P23 may be electrically disconnected from each other. The third switch 830 may change the switch SW31 to OFF state. When the switch SW31 is changed to OFF state, the ports P31 and P32 may be electrically disconnected from each other.

In steps S850 and S860, after the switches of the switches are changed to OFF state, the first end node 811 may additionally transmit the wake-up signal and the message. The reason that the first end node 811 further transmits the wake-up signal and message is for a channel using a PHY layer which is not connected through the switches. For example, as illustrated in FIG. 3, an external PHY layer that is not connected through the switches SW11-SW31 may not receive the wake-up signal and the message until the system booting of the switches 810, 820, and 830 is completed. After the system booting of the switches 810, 820, and 830 is completed, the first end node 811 may further transmit the wake-up signal and message so that the wake-up signal and message are transmitted through the channel using the external PHY layer. The first end node 811 may further transmit the wake-up signal and the message a plurality of times.

The above description has been made with reference to FIGS. 1 to 14 on the operation method of the communication node and the communication node according to the embodiments of the present disclosure. According to the embodiments described above, the switches may be used to manage the electrical connections between the PHY layers of the switches. When the switches are in the sleep mode, the signals are transmitted between the PHY layers through the switches, thereby shortening the time required for the end nodes to wake up. Also, the message indicating the wake-up reason can be transferred to the end nodes without missing.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A communication node in a vehicle network comprising:
   a medium access control (MAC) layer;
   a physical (PHY) layer;
   a first port connected to the PHY layer;
   a second port connected to the PHY layer; and
   a switch controlling a connection between the first port and the second port,
   wherein the switch turns on or off the connection between the first port and the second port under control of the MAC layer,
   wherein, when the communication node is in a sleep mode, the switch transfers a signal received through the first port to the second port, and the signal received through the first port is transferred to another communication node through the second port without performing a system booting procedure for the communication node, and wherein the switch comprises:
   a first transistor including a source, a drain, and a gate receiving a signal from the PHY layer;
   a second transistor including a gate connected to the source of the first transistor, a source connected to the first port, and a drain connected to the second port; and
   a resistor connected between the source of the first transistor and a ground electrode.

2. The communication node according to claim 1, wherein the PHY layer applies a signal for changing an ON/OFF state of the switch when booting of the communication node is completed.

3. The communication node according to claim 2, wherein the switch turns on the connection between the first port and the second port when the communication node is in the sleep mode, and turns off the connection between the first port and the second port when the communication node is awake and in a normal mode.

4. The communication node according to claim 1, wherein the switch comprises:
   a first sub-switch receiving a signal from the PHY layer; and
   at least one second sub-switch controlling the connection between the first port and the second port according to an ON/OFF state of the first sub-switch.

5. The communication node according to claim 4, wherein the first sub-switch includes an N channel metal oxide silicon field effect transistor (MOSFET), and the at least one second sub-switch include a P channel MOSFET.

6. The communication node according to claim 1, wherein the first transistor is an N channel MOSFET, and the second transistor is a P channel MOSFET.

7. The communication node according to claim 1, wherein the switch further comprises a third transistor including a gate connected to the source of the first transistor, a source connected to the second port, and a drain connected to the first port.

8. The communication node according to claim 7, wherein the first transistor is an N channel MOSFET, and the second and third transistors are P channel MOSFETs.

9. The communication node according to claim 1, wherein the first port receives a message indicating a wake-up reason from another communication node having detected an event.

10. The communication node according to claim 9, wherein, when the communication node is in the sleep mode, the switch transfers the message received through the first port to the second port, and the message received through the first port is transferred to another communication node through the second port.

11. An operation method of a first communication node including a medium access control (MAC) layer, a physical (PHY) layer, a first port connected to the PHY layer, and a second port connected to the PHY layer, the operation method comprising:
   receiving, by the first port, a first signal from a second communication node;
   when the first communication node is in a sleep mode, transferring the first signal received by the first port to the second port by electrically connecting the first port and the second port through a switch controlling a connection between the first port and the second port;
   transferring, by the second port, the first signal transferred from the first port to a third communication node connected to the second port,
   wherein, when the first communication node is in the sleep mode, the switch transfers the first signal received through the first port to the second port, and the first signal received through the first port is transferred to the third communication node through the second port without performing a system booting procedure for the first communication node, and wherein the switch comprises:
   a first transistor including a source, a drain, and a gate receiving a second signal from the PHY layer;
   a second transistor including a gate connected to the source of the first transistor, a source connected to the first port, and a drain connected to the second port; and
   a resistor connected between the source of the first transistor and a ground electrode, and
   wherein, when the first communication node is awake and in a normal mode, the PHY layer turns off the connection between the first port and the second port by applying the second signal to the gate of the first transistor.

12. The operation method according to claim 11, wherein the switch turns on the connection between the first port and the second port when the first communication node is in the sleep mode, and turns off the connection between the first port and the second port when the first communication node is awake and in the normal mode.

13. The operation method according to claim 11, further comprising receiving, by the first port, a message indicating a wake-up reason from the second communication node.

14. The operation method according to claim 11, wherein the switch further comprises a third transistor including a gate connected to the source of the first transistor, a source connected to the second port, and a drain connected to the first port.

15. The operation method according to claim 14, wherein the first transistor is an N channel MOSFET, and the second and third transistors are P channel MOSFETs.

16. A communication node in a vehicle network comprising:
   a medium access control (MAC) layer;
   a physical (PHY) layer;
   a first port connected to the PHY layer;
   a second port connected to the PHY layer; and
   a switch controlling a connection between the first port and the second port,
   wherein the switch turns on or off the connection between the first port and the second port under control of the MAC layer,
   wherein, when the communication node is in a sleep mode, the switch transfers a first signal received through the first port to the second port, and the first signal received through the first port is transferred to another communication node through the second port without performing a system booting procedure for the communication node,
   wherein the switch comprises:
      a first transistor including a source connected to the first port, a drain connected to the second port, and a gate receiving a second signal from the PHY layer; and
      a second transistor including a source connected to the second port, a drain connected to the first port, and a gate receiving the second signal from the PHY layer, and
   wherein the PHY layer turns off the connection between the first port and the second port by applying the second signal to the gates of the first transistor and the second transistor when the first communication node is awake and in a normal mode.

* * * * *